United States Patent Office 3,249,188
Patented May 3, 1966

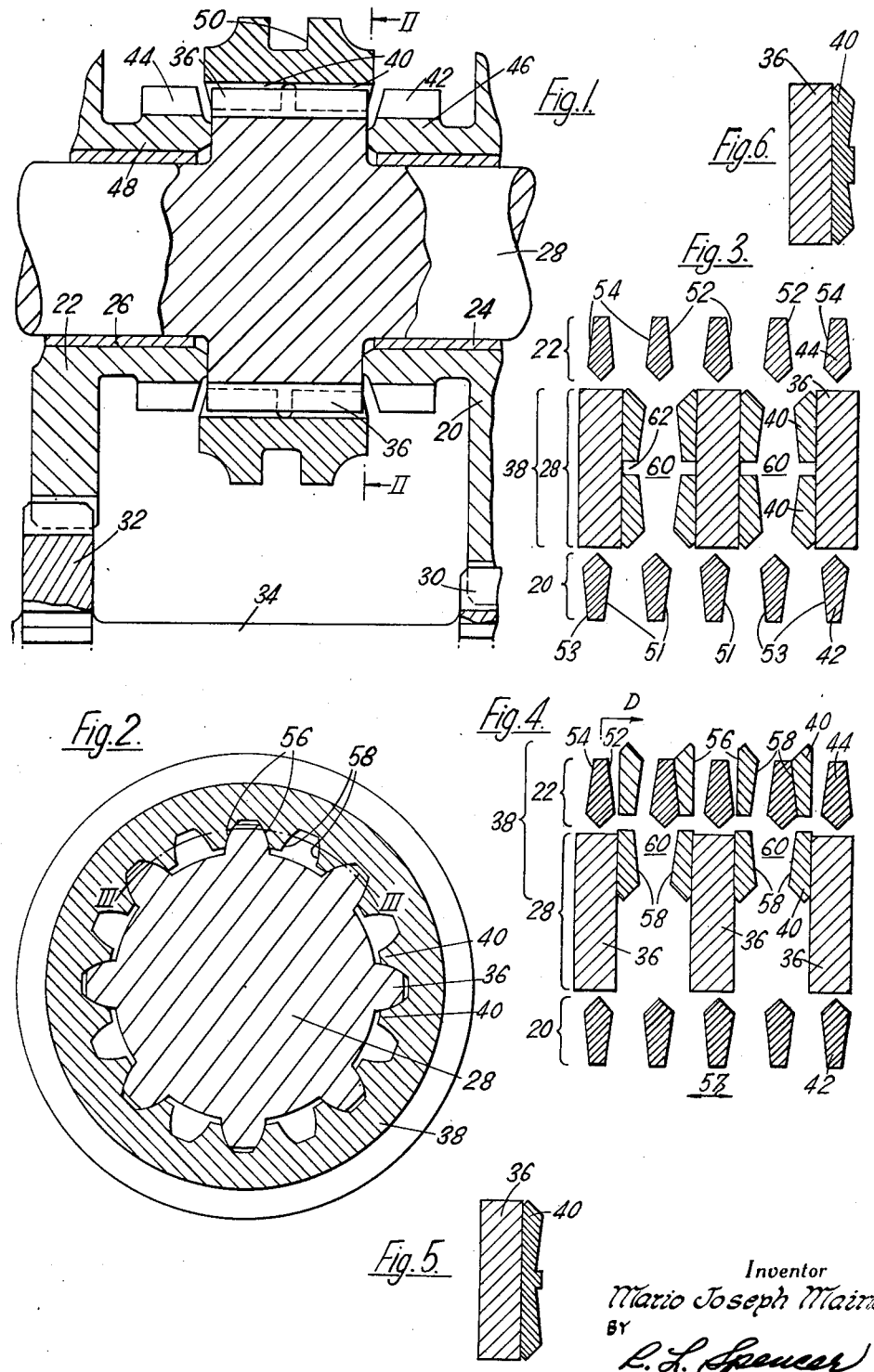

3,249,188
SLEEVE CLUTCH ASSEMBLIES HAVING ENGAGEABLE TAPERED TEETH
Mario Joseph Maina, Luton, England, assignor to General Motors Corporation, a corporation of Delaware
Filed Nov. 14, 1963, Ser. No. 323,767
Claims priority, application Great Britain, Nov. 20, 1962, 43,887/62
12 Claims. (Cl. 192—67)

This invention relates to sleeve clutch assemblies comprising an internally toothed clutch sleeve slidable along axial splines of a rotary shaft to selectively establish a connection between the shaft and external dog teeth of at least one gearwheel which is rotatably mounted on the shaft.

It is an object of the invention to provide a sleeve clutch assembly which has a positive anti-jump-out characteristic and can also be kept short without loss of contact with the axial splines along which the clutch sleeve is slidable.

It is another object of the invention to provide a sleeve clutch assembly in which the external dog teeth are axially tapered on both flanks, and the teeth of the clutch sleeve have some facing pairs of parallel tooth flanks which extend axially for engagement with the parallel axial splines on the shaft, and other facing pairs of tooth flanks which are axially tapered for engagement with the tapered flanks of the dog teeth.

In the drawings:

FIGURE 1 is a partial sectional elevation, shown somewhat schematically and with synchronising devices omitted for clarity, of a part of a motor vehicle gearbox incorporating a preferred embodiment of a sleeve clutch assembly according to the invention.

FIGURE 2 is a cross-section on the line II—II of FIGURE 1, in the direction of the arrows;

FIGURE 3 is a developed view on the pitch circle III—III shown in interrupted lines in FIGURE 2, and shows the tooth relationship with the clutch sleeve in a neutral position;

FIGURE 4 is a view similar to FIGURE 3, but with the clutch sleeve in one of its engaged positions; and FIGURES 5 and 6 show alternative tooth shapes for the teeth of the clutch sleeve.

The sleeve clutch assembly which is shown in the drawings forms part of a conventional motor vehicle gearbox of the constant-mesh type, in which second and third gear gearwheels 20 and 22 rotatably mounted on respective bearing sleeves 24 and 26 on a mainshaft 28 forming the output shaft of the gearbox are, during operation of the gearbox, constantly driven at different speeds by means of respective sets of gear teeth 30 and 32 spaced along a countershaft 34 which extends parallel to the mainshaft and is rotated in the conventional manner through a gearset (not shown) by an engine-driven input shaft (also not shown). The mainshaft 28 is formed with axially extending splines 36 in the region between the second and third gear gearwheels 20 and 22, a clutch sleeve 38 provided with internal teeth 40 being slidable along these mainshaft splines between extreme positions in which one or other of the gearwheels is clutched to the mainshaft by engagement of the internal teeth 40 on the clutch sleeve with external dog teeth 42 and 44 formed on annular axial extensions 46 and 48 of the respective gearwheels. The clutch sleeve 38 can also assume an intermediate position, as shown in FIGURE 1, in which neither gearwheel is clutched to the mainshaft. The leading edges of the teeth 40, 42 and 44 are chamfered to a sharp edge in the conventional manner to facilitate engagement. A selector fork (not shown) engages a peripheral groove 50 in the clutch sleeve for movement of the clutch sleeve between its various positions. The sleeve clutch assembly as described so far is conventional in both construction and operation.

As shown in FIGURES 3 and 4, each dog tooth 42 and 44 of the respective gearwheels 20 and 22 has both its flanks axially tapered, in a sense preventing clutch jump-out. For instance, referring to the dog teeth 44 of the third gear gearwheel 22, the tapered flanks 52 which face in one peripheral direction prevent jump-out during the normal drive condition in which the engine drives the vehicle wheels and thereby moves the dog teeth 44 in the direction indicated by the arrow D in FIGURE 4, and the tapered flanks 54 which face in the other peripheral direction prevent jump-out during the overrun condition in which the vehicle wheels temporarily drive the engine.

Alternate pairs 56 of facing flanks of the teeth 40 of the clutch sleeve 38 extend axially, thereby forming a parallel-sided tooth gap 57 for the reception of the parallel axial splines 36 on the mainshaft 28, and the remaining pairs 58 of tooth flanks of the clutch sleeve are tapered at the same angle as the tapered flanks 52 and 54 of the dog teeth 44, and corresponding tapered flanks 51 and 53 of the dog teeth 42, to form a diamond-shaped tooth gap 60 for the reception of a tapered dog tooth (44—FIGURE 4) of the gearwheel 22 which is to be clutched to the mainshaft 28. In this embodiment, there are twice as many dog teeth on each of the gearwheels as there are splines on the rotary shaft, so that in the clutch-engaged position, as shown in FIGURE 4, every alternate one of those tapered dog tooth flanks 52 of the selected gearwheel 22 which face in one peripheral direction is in engagement with a tapered tooth flank 58 of one end portion of the clutch sleeve, 38 but—because of the relative widths of the parallel-sided tooth gaps 57 and the diamond-shaped tooth gaps 60 of the clutch sleeve—the intervening tapered dog tooth flanks 52 which face in this direction are clear of the axially extending parallel tooth flanks 56 of this end portion of the clutch sleeve.

Because the axially extending parallel tooth flanks of the clutch sleeve, which provide control with the mainshaft splines, are within the axial length of the tapered tooth flanks providing control with the dog teeth, the clutch sleeve can be kept short. A compact sleeve clutch assembly is therefore possible.

In the preferred embodiment of the sleeve clutch assembly according to the invention which has been particularly described, half the tooth flanks on the clutch sleeve are a sliding fit in the mainshaft splines, thus providing maximum control, and the other half of the tooth flanks on the clutch sleeve can taper-engage the dog teeth of one or other of the gearwheels, thus providing a positive anti-jump-out characteristic.

The two functions of a controlled fit on the mainshaft and the anti-jump-out can therefore be kept separate, thus avoiding compromise in either one or the other.

The tapered flanks of the clutch sleeve teeth may be produced by first broaching or cutting axially extending parallel flanks and then forming a taper on the flanks by means of a shaping cutter. If the gaps bounded by the axially extending flanks are made alternately wide and narrow, the shaping cutter will clear the axially extending flanks of the wide gaps and cut a taper only on the flanks of the narrow gaps, whereby the required alternate axially extending parallel and tapered pairs of tooth gaps having suitable relative widths may readily be obtained. The clutch sleeve of the preferred embodiment has an internal peripheral groove 62 (FIGURE 3) into which the shaping cutter may run out after traversing approximately half the length of the tooth, thereby minimizing the raising of burrs in the forming of the taper. However, the groove could be omitted: the cutter would then be stopped before reaching the mid-position, to give a tooth shape for example as shown in FIGURE 5, and the resulting burr could be sufficiently reduced mechanically, for example by means of a deburring broach. Alternatively, for some applications, as for use with a long clutch sleeve, it might be preferable to stop the cutter considerably before the mid-position, to give a tooth shape for example as shown in FIGURE 6.

Various other modifications of the sleeve clutch assembly are possible within the scope of the present invention. For example, instead of a double clutch sleeve it is possible to use a single clutch sleeve, which is required to assume only two positions, namely on the one hand a neutral position and on the other hand a single engaged position in which a gearwheel is clutched to the mainshaft.

I claim:

1. A sleeve clutch assembly comprising a rotary shaft, axially extending splines formed on the rotary shaft, at least one gearwheel rotatably mounted on the rotary shaft adjacent the splines thereof, means for effecting rotation of the gearwheel on the rotary shaft, external dog teeth which are formed on a portion of the gearwheel adjacent the shaft splines and are axially tapered on both flanks, and a clutch sleeve which is slidably mounted on the shaft splines for selective establishment of a connection between the external dog teeth of the gearwheel and the rotary shaft, the clutch sleeve being formed with internal teeth having the facing flanks of adjacent teeth which extend axially for engagement with the axial splines on the shaft being parallel, and the other facing flanks of adjacent teeth being axially tapered for engagement with the tapered flanks of the dog teeth.

2. A sleeve clutch assembly comprising a rotary shaft, axially extending splines formed on the rotary shaft, at least one gearwheel rotatably mounted on the rotary shaft adjacent the splines thereof, means for effecting rotation of the gearwheel on the rotary shaft, external dog teeth which are formed on a portion of the gearwheel adjacent the shaft and are axially tapered on both flanks, and a clutch sleeve which is slidably mounted on the shaft splines for selective establishment of a connection between the external dog teeth of the gearwheel and the rotary shaft, the clutch sleeve being formed with internal teeth having the facing flanks of adjacent teeth which extend axially for engagement with the axial splines on the shaft being parallel, and the other facing flanks of adjacent teeth being axially tapered for engagement with the tapered flanks of the dog teeth, the tapering of the tooth flanks being in such a sense as to prevent jump-out of the clutch sleeve teeth in either direction of rotation.

3. A sleeve clutch assembly comprising a rotary shaft, first and second gearwheels rotatably mounted on the rotary shaft in axially spaced relationship, axially extending splines formed on the rotary shaft in the region between the first and second gearwheels, means for effecting rotation of the first and second gearwheels at different speeds of rotation, external dog teeth which are formed on a portion of each of the gearwheels adjacent the shaft splines and are axially tapered on both flanks, and a clutch sleeve which is slidably mounted on the shaft splines for selective establishment of a connection between the external dog teeth of a selected one of the gearwheels and the rotary shaft, the clutch sleeve being formed with internal dog teeth having some facing pairs of parallel tooth flanks which extend axially for engagement with the axial splines on the shaft, and other facing pairs of tooth flanks a first end portion of which is axially tapered in one sense for engagement with the tapered flanks of the dog teeth of the first gearwheel and a second end portion of which is axially tapered in another sense for engagement with the tapered flanks of the dog teeth of the second gearwheel.

4. A sleeve clutch assembly comprising a rotary shaft, first and second gearwheels rotatably mounted on the rotary shaft in axially spaced relationship, axially extending splines formed on the rotary shaft in the region between the first and second gearwheels, means for effecting rotation of the first and second gearwheels at different speeds of rotation, external dog teeth which are formed on a portion of each of the gearwheels adjacent the shaft splines and are axially tapered on both flanks, and a clutch sleeve which is slidably mounted on the shaft splines for selective establishment of a connection between the external dog teeth of a selected one of the gearwheels and the rotary shaft, the clutch sleeve being formed with internal dog teeth having some facing pairs of parallel tooth flanks which extend axially for engagement with the axial splines on the shaft, and other facing pairs of tooth flanks a first end portion of which is axially tapered in one sense for engagement with the tapered flanks of the dog teeth of the first gearwheel and a second end portion of which is axially tapered in another sense for engagement with the tapered flanks of the dog teeth of the second gearwheel, the tapering of the two portions of the tooth flanks being in such a sense as to prevent jump-out of the clutch sleeve teeth in either direction of rotation.

5. A sleeve clutch assembly according to claim 4, wherein the number of dog teeth on the gearwheel is twice the number of splines on the rotary shaft.

6. A sleeve clutch assembly according to claim 5, wherein alternate facing pairs of tooth flanks on the clutch sleeve are parallel and extend axially for engagement with the axial splines on the shaft, whereas the intervening facing pairs of tooth flanks on the clutch sleeve are axially tapered for engagement with the tapered flanks of the dog teeth.

7. A sleeve clutch assembly according to claim 4, wherein the clutch sleeve defines an internal peripheral groove separating the tooth flanks tapered in the one sense from the tooth flanks tapered in the other sense.

8. A sleeve clutch assembly according to claim 4, wherein the axial length of the splines on the rotary shaft is substantially the same as the axial length of the internal teeth of the clutch sleeve.

9. A sleeve clutch assembly according to claim 4, wherein the gearwheels are rotated on the rotary shaft at different speeds of rotation by respective sets of gear teeth on a countershaft which extends parallel to the rotary shaft and is rotated by an engine.

10. A sleeve clutch assembly according to claim 4, wherein the gearwheels are rotated on the rotary shaft at different speeds of rotation by respective sets of gear teeth on a countershaft which extends parallel to the rotary shaft and is rotated through a grearset by an engine-driven input shaft.

11. A sleeve clutch assembly according to claim 4, wherein the clutch sleeve defines a peripheral groove which can be engaged by a slidable selector fork for effecting sliding movement of the clutch sleeve along the axially etxending splines.

12. A sleeve clutch assembly comprising a rotary shaft, first and second gearwheels rotatably mounted on the rotary shaft in axially spaced relationship, axially extending splines formed on the rotary shaft in the region between the first and second gearwheels, a countershaft which extends parallel to the rotary shaft and is rotatable through a gearset by an engine-driven input shaft, the countershaft including respective sets of gear teeth meshing with the teeth of the first and second gearwheels on the rotary shaft such that the said gearwheels are rotated at different speeds of rotation consequent on rotation of the countershaft, external dog teeth which are formed on a portion of each of the gearwheels adjacent the shaft splines, and a clutch sleeve which is slidably mounted on the shaft splines for selective establishment of a connection between the external dog teeth of a selected one of the gearwheels and the rotary shaft, said connection being effected by internal teeth which are formed on the clutch sleeve and have alternate facing pairs of parallel tooth flanks extending axially for engagement with the axial splines on the shaft, the intervening facing pairs of tooth flanks of the clutch sleeve being axially tapered in opposite senses at the two axial ends thereof whereby to form diamond-shaped tooth gaps for the reception of respective dog teeth of the selected gearwheel, these dog teeth being tapered on both flanks at the same angle as the respective flanks of the teeth on the clutch sleeve for permitting engagement of the complementarily tapered flanks whilst preventing jump-out of the clutch sleeve teeth in either direction of rotation.

References Cited by the Examiner
UNITED STATES PATENTS

| | | | |
|---|---|---|---|
| 1,935,965 | 11/1933 | Wahlberg | 192—67 |
| 3,043,414 | 7/1962 | Peras | 192—67 X |
| 3,137,376 | 6/1964 | Schick | 192—67 |

DON A. WAITE, *Primary Examiner.*

ARTHUR T. McKEON, *Assistant Examiner.*